(12) United States Patent
Wilson (10) Patent No.: US 6,345,692 B1
(45) Date of Patent: Feb. 12, 2002

(54) PORTABLE FLUID RECOVERY SYSTEM AND METHOD OF USE

(76) Inventor: Toney Hugh Wilson, 295 Sinclair Dr., Sarasota, FL (US) 34240

( * ) Notice: Subject to any disclaimer, the term of this patent is extended or adjusted under 35 U.S.C. 154(b) by 22 days.

(21) Appl. No.: 09/610,145

(22) Filed: Jul. 5, 2000

(51) Int. Cl.[7] ............................................. F16C 3/14
(52) U.S. Cl. ..................... 185/1.5; 185/106; 141/65; 141/114
(58) Field of Search ..................... 184/1.5, 29, 106; 141/65, 67, 114

(56) References Cited

U.S. PATENT DOCUMENTS

| | | | |
|---|---|---|---|
| 3,773,091 A | * 11/1973 | Boyd et al. | 184/1.5 |
| 4,054,184 A | * 10/1977 | Marcinko | 184/106 |
| 4,638,841 A | * 1/1987 | Heath | 184/106 |
| 5,318,080 A | * 6/1994 | Viken | 184/106 |
| 5,361,870 A | 11/1994 | Courcy | |
| 5,379,862 A | * 1/1995 | Schmidt et al. | 184/106 |
| 5,497,852 A | * 3/1996 | Little et al. | 184/29 |
| 5,522,474 A | 6/1996 | Burman | |
| 5,722,508 A | * 3/1998 | Kraus | 184/1.5 |
| 6,082,416 A | * 7/2000 | Viken | 184/1.5 |

FOREIGN PATENT DOCUMENTS

EP      628761 A1 * 12/1994 ................. 184/1.5

* cited by examiner

Primary Examiner—David A. Bucci
Assistant Examiner—Chong H. Kim
(74) Attorney, Agent, or Firm—Dorothy S. Morse (57) ABSTRACT

A readily portable system and method for its use for the safe, orderly, and efficient recovery of fluid drained from a motor vehicle, including drained fluid that is hot, such as the hot gear lube drained from the quick-change rear end of a race vehicle prior to ratio gear exchange, and the prompt, safe, neat and efficient return of the recovered fluid to the source from which it was drained, when it is still serviceable. The preferred embodiment has solid heavy-duty construction and a low profile dual-chambered reservoir with a small air chamber separated from a larger fluid chamber by a flexible baffle. The fluid chamber has a discharge opening in a position remote from the baffle and a flexible flame-resistant discharge hose is connected to the discharge opening during use. The present invention further comprises a large surface area collection pan detachably mounted upon the fluid chamber, a valve positioned therebetween for selective fluid flow, and a collection pan cover for keeping the drained fluid or hot gear-lube-covered gears placed in the collection pan protected from pairborne debris. Although primarily contemplated for racing applications to assist gear exchange in the quick-change rear end of a race vehicle, the present invention system can also be employed for the neat and orderly recovery, and safe temporary storage, of other flammable and non-flammable fluid prior to its reuse or discard, particularly fluid having an adverse environmental impact when spilled or improperly discarded.

20 Claims, 2 Drawing Sheets

FIG. 2

PORTABLE FLUID RECOVERY SYSTEM AND METHOD OF USE

BACKGROUND

1. Field of Invention

This invention relates to motor vehicle fluid exchange systems, specifically to a readily portable system and method for the safe, orderly, and efficient recovery of fluid drained from a motor vehicle, including drained fluid that is hot, such as the hot gear lube drained from the quick-change rear end of a race vehicle prior to ratio gear exchange, and the prompt, safe and efficient return of the recovered fluid to the source from which it was drained, when it is still serviceable, to prevent waste and unnecessary environmental burden. The present invention system is made from solid heavy-duty construction, however, it is compact in size and configuration to permit easy one-handed transport. It has an elevated collection pan with a large surface area for spill-free fluid collection, which can also be used to temporarily store hot messy gear-lube-covered gears removed from a quick-change rear end. Through use of the present invention, the same quantity of hot gear lube present in the quick-change rear end of a race vehicle can be safely, orderly, and repeatedly collected during a series of trackside ratio gear exchanges performed in a track testing, pre-race practice, or qualifying session, and then, when still serviceable, can be promptly, orderly, efficiently, and safely returned to the quick-change rear end for reuse. Thus, the present invention provides race crews with a safe and convenient alternative to the former wasteful and environmentally adverse practice of discarding still serviceable gear lube and replacing it with new gear lube each time the ratio gears in the quick-change rear end of a race vehicle were exchanged. The preferred embodiment of the present invention has a low profile dual-chambered reservoir with large easily gripped handles attached thereto, one of the chambers being a smaller pre-charged air chamber and the other being a larger fluid chamber separated from the air chamber by a flexible baffle. The fluid chamber provides temporary fluid containment during which the recovered fluid is protected from airborne contaminants and fire hazard, features important for trackside use. The fluid chamber has a female threaded discharge opening in a position remote from the baffle, to which the male threaded end of a flexible flame-resistant discharge hose is connected during fluid recovery use. The fluid collection pan is connected to the reservoir through the upper surface of the fluid chamber, and a valve is positioned between the upper collection pan and the fluid chamber to selectively allow fluid communication therebetween. As a result, fluid drained into the collection pan can be gravity-fed into the fluid chamber for storage and subsequent dispensing through the discharge hose. The present invention further comprises a securely-fitting but easily installed and removed collection pan cover for use in keeping inside surfaces of the collection pan protected from airborne debris when the collection pan is used to store gears and during periods of non-use. In the preferred embodiment the collection pan is separable from the reservoir for compact storage of the system between uses. Although primarily contemplated for racing applications to assist gear exchange in the quick-change rear end of a race vehicle, the present invention system can also be employed for the neat and orderly recovery, and safe temporary storage, of other flammable and non-flammable fluid prior to its reuse or discard, particularly fluid that would have an adverse environmental impact if spilled or improperly discarded.

2. Description of Prior Art

The gears in a motor vehicle transmission adapt available engine power to meet the changing conditions of the road and provide optimum torque for a given engine speed. Smaller gears provide more torque at lower speeds and allow a vehicle to start moving or drive uphill. Larger gears provide less torque at higher speeds and allow the vehicle to run more efficiently at high speeds on level ground. Typically, personal vehicles use a standard set of gears throughout the life of the vehicle for all driving conditions, and gear lube is exchanged only when it is no longer considered serviceable. In contrast, race crews may change-out gears in a race vehicle multiple times before a race in response to track testing and qualifying sessions conducted to determine peak vehicle performance. Further, to increase the dependability of the transmission and enhance the opportunity for a win, race crews often will install new gears prior to a race. In order to perform rapid gear exchanges, some race vehicles will use a quick-change rear end, since a quick-change rear end can remain in place within the race vehicle while gear change-out occurs. Thus, multiple gear exchanges can take place over a short period of time in testing, practice, and qualifying sessions, and often, although the gear lube drained prior to each exchange may still be usable, it is discarded and replaced by new gear lube for the safety and convenience of the race crew. Also, when gears are exchanged in the quick-change rear end of a race vehicle, the gear lube remains hot, contrary to the usual practice in transmission gear exchange where the transmission is allowed to cool and where the entire transmission must be removed from a vehicle and dismantled to change out a gear. Trackside safety hazards, including fire, are always a concern in the storage of any new or used fluid, and another consideration is the liberal amount of loose and potentially airborne debris typically found at race tracks, to include a significant amount of debris created by the soft compound racing tires used for improved vehicle traction at speed. In addition, reintroducing hot used gear lube back into a quick-change rear end of a race vehicle is not practical unless it can be accomplished in a safe maimer and without a mess, since at some tracks race teams are subject to fines for dropped fluids.

The present invention addresses all of the above concerns by permitting the orderly and safe collection of used gear lube, its safe and contamination-free storage until gear exchange is complete, and the prompt, efficient, and safe return of still serviceable drain lube back into the quick-change rear end of a race vehicle without a mess through use of a flexible flame-resistant discharge hose, so that the unnecessary waste and environmental burden relating to the premature discard of still serviceable gear lube can be substantially reduced. Motor vehicle racing is a sport that is growing in popularity on both professional and amateur levels. More people are competing, they are competing more often, and many competitors currently maintain multiple race vehicles in order to participate in a variety of racing events and stay competitive. As the sport continues to grow, and with the ever-increasing financial rewards of a win motivating race crews to maximize every competitive advantage, the premature discard of still serviceable fluids, including still usable drain lube from quick-change rear ends, will continue to increase and pose a significant source of waste and unnecessary environmental burden unless a convenient and safe means is found for their recovery and reuse. It is not heretofore known to have a readily portable system or device with a low profile reservoir incorporating a small air chamber separated from a larger fluid chamber by a flexible baffle, and also having a large surface area collection pan and a flexible flame-resistant discharge hose connected to the fluid chamber, that facilitates and expedites the recovery of hot used gear lube in a manner that is safe and convenient for race crew use, and promotes reuse of recovered gear lube when it is still serviceable.

Various devices exist to collect transmission fluid drained from motor vehicles during their maintenance and repair. There are also inventions that simultaneously replenish the transmission with fresh fluid as the old fluid is withdrawn. The inventions thought to be most closely related to the present invention are the inventions used for transmission fluid exchange disclosed in U.S. Pat. No. 5,361,870 to Courcy (1994) and U.S. Pat. No. 5,522,474 to Burman (1996). The Courcy and Burman inventions both comprise tank/reservoir structures having two chambers. However, many differences exist between the present invention and the Courcy and Burman inventions. The Courcy and Burman inventions each utilizes a piston between the two chambers in the reservoir. In contrast, the present invention employs a flexible baffle between its smaller air chamber and its larger fluid chamber. In addition, both of the chambers in the Courcy and Burman inventions are configured to hold transmission fluid, one adapted to receive used fluid from a transmission, and the other adapted replenish the same transmission with fresh fluid. In contrast, only one chamber in the present invention is configured to contain gear lube, the other being configured to function as a pressurized air chamber. Also, neither the Courcy nor the Burman invention is adapted for use with hot gear lube, and neither has a contaminant-free area for temporary storage of hot messy gear-lube-covered gears. In contrast, the present invention comprises a large surface area collection pan for the rapid and spill-free recovery of drained gear lube, as well as for providing a safe, temporary storage area for the usually hot messy gear-lube-covered gears changed out of a quick-change rear end. Also, drained gear lube can be safely stored in the present invention for an extended period of time, followed by the rapid and orderly return of the drained lube, when it is still serviceable, to a quick-change rear end. Since the Courcy and the Burman inventions function to simultaneously withdraw and replenish transmission fluid, neither is easily able to temporarily store hot drain lube and then return it to a quick-change rear end after gear change is complete. Therefore, it would be useful and it is not heretofore known to have a compact, heavy-duty, readily portable device for the efficient, prompt, safe, and spill-free return of serviceable drain lube into the quick-change rear end of a race vehicle during testing, practice, and qualifying sessions when ratio gears can be frequently and repeatedly changed-out to determine optimum vehicle performance in advance of a race. No invention is known that has all of the features and advantages of the present invention.

SUMMARY OF INVENTION—OBJECTS AND ADVANTAGES

The primary object of this invention is to provide an easily portable means for the neat and orderly collection of fluids drained from motor vehicles, temporary storage of recovered fluid in a protected and contaminant-free environment, followed by the prompt, safe, efficient, and spill-free return of the recovered fluid, when it is still serviceable, to the source from which it was drained for reuse. A further object of this invention is to provide a fluid recovery system that can accommodate hot fluid. It is also an object of this invention to provide a fluid recovery system that can be used for flammable fluid and which protects it from inadvertent sources of ignition. Another object of this invention is to provide a fluid recovery system that by design and construction minimizes fluid spills during collection, storage, and discharge of recovered fluid. It is also an object of this invention to provide a fluid recovery system for trackside use that motivates race crews to recover and reuse still serviceable hot gear lube repeatedly drained from the quick-change rear end of a race vehicle during tack testing and qualifying sessions prior to ratio gear change-out, and thereby cause abandonment of the wasteful and environmentally adverse practice now used of discarding the still serviceable drain lube each time in favor of new gear lube. It is a further object of this invention to provide a fluid recovery system that can be collapsed into a compact configuration for efficient storage. It is also an object of this invention to provide a fluid recovery system that is simple in design, cost effective to manufacture, and allows for neat, easy, consistent, and dependable operator use.

As described herein, properly manufactured and used, the present invention would provide a readily portable and easy-to-use system for collecting hot fluid drained from a motor vehicle, temporarily storing recovered fluid so that it is protected from airborne contaminants and inadvertent sources of ignition, and subsequently returning it in a prompt, safe, efficient, and consistent manner, when it is still serviceable, to the source from which it was drained. The compact design of the present invention with its preferred length, width, and height dimensions creating a total volume of less than one cubic foot, the low profile shape of its reservoir, and the large, easily gripped handles attached to the reservoir, all enhance its portability and ease of use. Also, the stainless steel materials, from which it is preferably made, give the present invention the solid, heavy-duty construction that make it particularly suitable for use with hot fluid and promote its ability to protect flammable fluid stored in its reservoir from inadvertent sources of ignition. A flame-resistant flexible discharge hose, as well as the removable cover configured for fitting securely over the upper open end of the collection pan to help keep the inside collection surface free from airborne contaminants, also assist in protecting recovered fluid from inadvertent sources of ignition. The collection pan cover similarly protects hot gear-lube-covered gears removed from a quick-change rear end when they are placed on its fluid collection surface for temporary storage and cooling. The low profile configuration and solid construction of the present invention make it particularly suited for easy and prompt positioning under the quick-change rear end of a race vehicle with little or no adjustment, when the present invention is used for the recovery and temporary storage of still serviceable gear lube and its return to the quick-change rear end after gear change-out. Although not critical, it is preferred that the collection pan is configured to be detachable from the reservoir for compact storage of the present invention between uses. The large size of the reservoir as compared to the collection pan, the flattened configuration of the reservoir, and the approximate centering of the fluid collection pan above the air and fluid chambers, also help to provide a low center of gravity for stable fluid collection and storage, with a low risk of inadvertent tipping and fluid spills caused by casual contact with the collection pan or reservoir. Also, the reservoir is reduced in height at its discharge end, further adding to its design stability. In addition, the inside collection surface of the collection pan, having a preferred surface area slightly less than one square foot, is sufficiently large to gather drained fluid such as gear lube without spills and overflow, yet it is also sufficiently small to allow convenient transport of the present invention and easy positioning under a motor vehicle for efficient fluid recovery. The inside collection surface of the collection pan slopes downwardly in all directions toward a centrally located screen-covered hole that leads to a fluid transfer pipe connecting the collection pan with the fluid chamber. The sloping surface provides a slight incline to enhance the speed of fluid movement into the fluid chamber after collection, the screen being used to prevent the entry of any object into the fluid chamber that could impede flow of recovered fluid through the discharge hose. A flexible baffle fixed within the reservoir defines two chambers, a smaller air chamber and an adjacent larger fluid chamber. The baffle extends the full width and height of the reservoir and flexes to facilitate prompt flow of recovered fluid from the fluid chamber and into the flame-resistant discharge hose for neat and orderly delivery of the recovered fluid to a targeted location, such as the return of still serviceable drain lube to the quick-change rear end of a race vehicle without a mess. It is contemplated for the air chamber to be pre-charged with compressed air prior to system use. End supports attached to the opposite ends of the reservoir protect the reservoir from direct impact with other objects during transport and positioning under a motor vehicle, and also provide a means for secure handle connection. An air relief valve and a vent valve are connected through the air chamber, in addition to the air inlet valve needed to pressurize the air chamber with compressed air, and provide an additional measure of safety during operator use. A mounting plate attached to the upper surface of the reservoir, spanning both the air and fluid chambers, improves the connection between the valves and the air chamber, as well as the connection between a fluid receiving tube and the upper surface of the fluid chamber, the distal end of the fluid receiving tube being used for connection with the distal end of the fluid transfer pipe on the collection pan.

An example of present invention use would be to recover still serviceable gear lube drained from the quick-change rear end of a race vehicle, safely store it until gear exchange was complete, and then efficiently return the serviceable drain lube to the quick-change rear end without a mess. To accomplish this an operator would connect the collection pan to the fluid chamber, in a position above it, and also connect the flexible flame-resistant discharge hose to the female threaded discharge opening in the end of the fluid chamber remote from the baffle. The fluid intake valve that regulates fluid flow between the collection pan to the fluid chamber would be adjusted to block fluid flow. Also prior to use, the operator would pre-pressurize the air chamber to approximately 60 pounds per square inch with compressed air. The assembled invention would then be placed under a race vehicle's quick-change rear end, whereafter gear lube in the quick-change rear end would be drained onto the inside collection surface of the collection pan without splashing or spills. For safe storage of the drain lube until gear change is complete, the fluid intake valve would be opened and the drain lube would be gravity-fed into fluid chamber. When substantially all of the drained lube has been transferred into the fluid chamber, the fluid intake valve would be closed and the collection pan cover placed securely over the upper open end of the collection pan to temporarily seal the inside collection surface and the recovered drain lube against airborne contaminants, as well as protect the recovered drain lube from inadvertent sources of ignition. During transfer of the drain lube from the collection pan to the fluid chamber, the distal end of the flame-resistant discharge hose should be elevated to a height greater than that of the fluid level in the reservoir, or otherwise positioned so as to block premature flow of drain lube from the distal end. When the recovered gear lube is needed for return to the quick-change rear end, the fluid intake valve between the collection pan and the fluid chamber would be opened and the cover on the collection pan would at least be partially removed, whereby the pre-pressurized air chamber would then cause the baffle between the fluid chamber and the air chamber to flex and assist in the movement of the recovered drain fluid through the flexible discharge hose, and into the quick-change rear end. Care should be taken when removing the collection pan cover any time hot drain lube is transferred to the fluid chamber, and particularly when hot gears are stored in the collection pan, as heat is transferred from the hot drain lube and the hot ratio gears to the present invention and can make the cover and other parts of the present invention very hot to touch. When the drain lube is no longer usable, the discharge hose can alternatively direct it to a targeted disposal receptacle without a mess. After use of the present invention is complete, the collection pan can be separated from the reservoir for cleaning and/or to create a more compact configuration for storage.

The description herein provides preferred embodiments of the present invention but should not be construed as limiting the scope of the fluid recovery system. For example, variations can occur in the configuration and type of material optionally used to construct the handle for the collection pan cover; the number of lid handles used; the overall configuration and dimension of the collection pan and the reservoir as long as the resulting system remains low in profile, readily portable, and able to resist tipping from casual contact during use; the capacity of the fluid chamber as long as the system remains easily portable; the configuration and positioning of the handles attached to the reservoir; the size and positioning of discharge opening in the end of the fluid chamber remote from the baffle; the depth of the collection pan; and the material from which the screen in the collecting surface of the collection pan is made, as well as the mesh size and configuration of the openings in the screen, and the means by which the screen is attached to the collection pan, other than those shown and described herein, may be incorporated into the present invention. Thus the scope of the present invention should be determined by the appended claims and their legal equivalents, rather than being limited to the examples given.

DETAILED DESCRIPTION OF PREFERRED EMBODIMENTS

Figure 1:
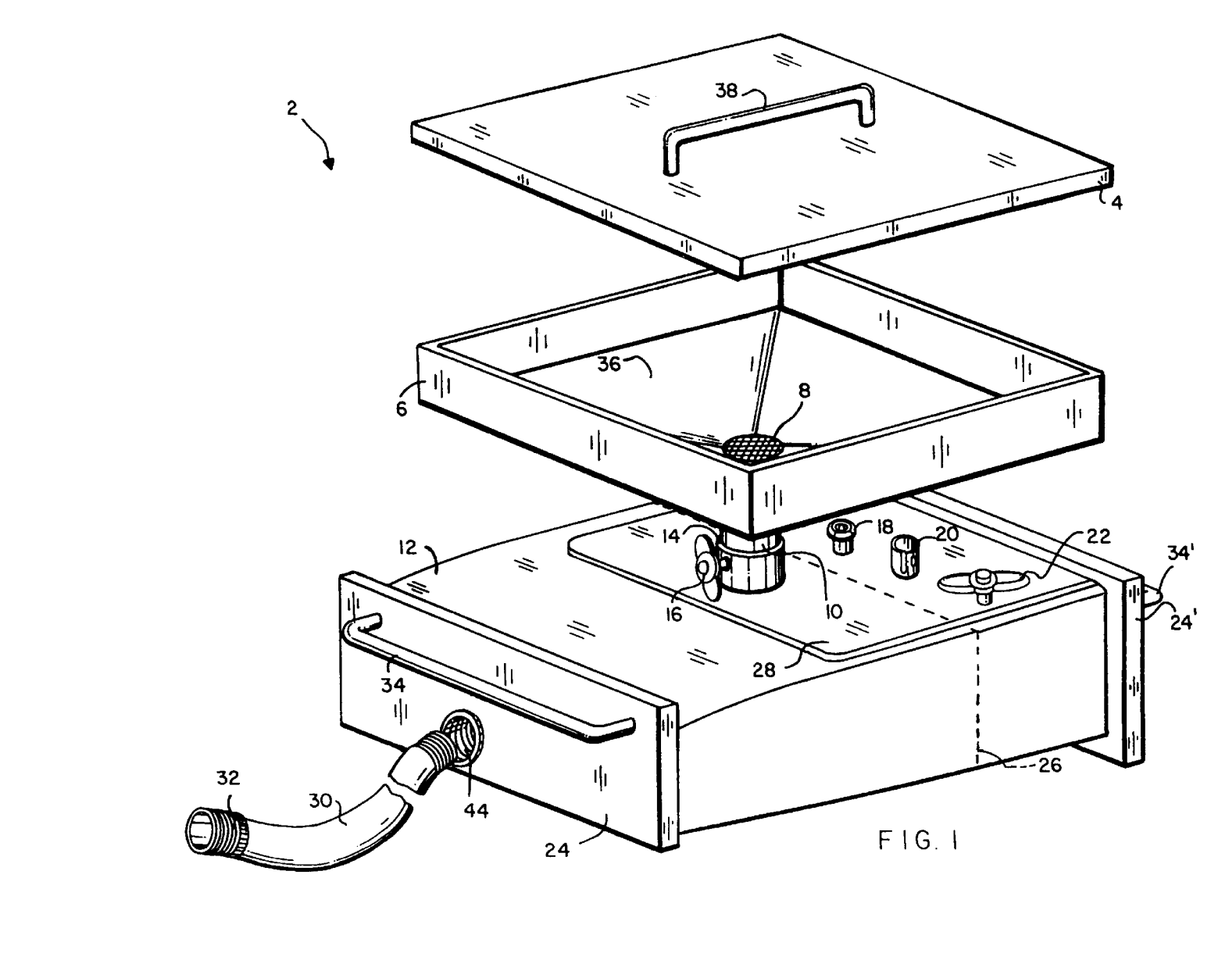
FIG. 1 is an exploded, perspective view of the preferred embodiment of a fluid recovery system having a dual-chamber reservoir with a fluid chamber separated from an air chamber by a flexible baffle, the fluid chamber having an upper receiving tube, a discharge opening remote from the baffle, and a narrowed configuration at its discharge end, the system also having a flame-resistant fluid discharge hose, a collection pan with a large fluid collection surface, and a cover configured for securely enclosing the collection pan to protect the fluid collection surface and residual fluids from airborne contaminants and inadvertent sources of ignition.
Figure 2:
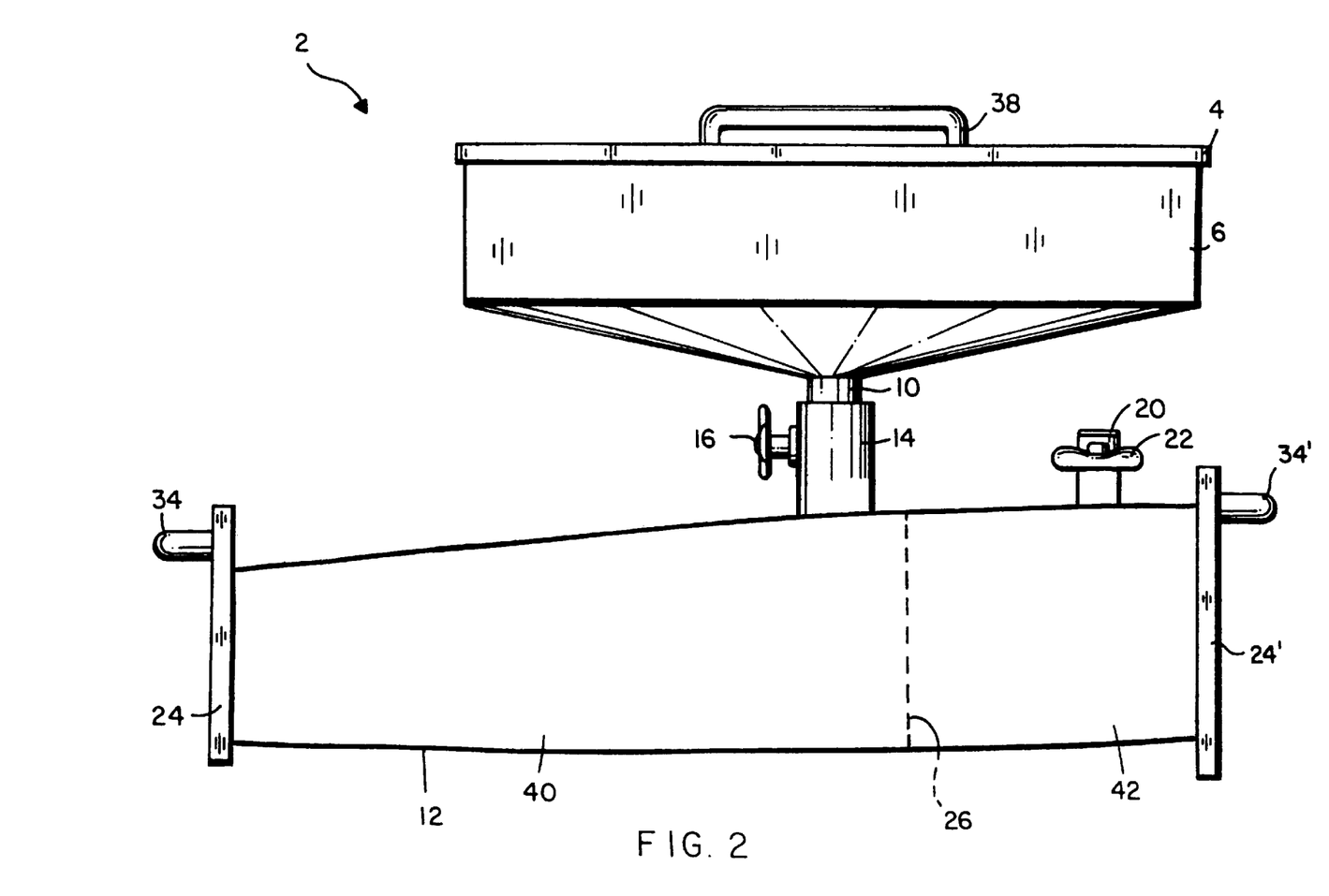
FIG. 2 is a side view of the preferred embodiment of the fluid recovery system of the present invention in the assembled configuration with the air chamber and the fluid chamber of the flattened reservoir being separated by a flexible baffle, the reservoir having a handle on each of its ends, a collection pan positioned for selective fluid communication with the fluid chamber, a cover closing the open upper end of the collection pan, and an air relief valve and an air vent valve being connected to the air chamber.

FIGS. 1 and 2 each show the most preferred embodiment of the fluid recovery system 2 of the present invention having a low profile compactly-configured reservoir 12, a collection pan 6 positioned above reservoir 12, connected thereto, and having a length dimension slightly smaller than that of reservoir 12, and a cover 4 configured for completely enclosing and securely sealing the open upper end of collection pan 6. FIGS. 1 and 2 also show a flexible baffle 26 positioned within reservoir 12 and functioning to separate a small air chamber 42 from a larger fluid chamber 40. Although not shown, in the preferred embodiments it is contemplated for flexible baffle 26 to be fixed in position relative to air chamber 42 and fluid chamber 40 and made to have a planar and substantially rectangular configuration, with a thickness dimension sufficiently small to permit flexing when subjected to differential changes in pressure. FIGS. 1 and 2 both show fluid chamber 40 having a length dimension approximately twice that of air chamber 42, and fluid chamber 40 narrowed slightly in height on the one of its ends remote from baffle 26. Although not limited thereto, in the most preferred embodiment it is contemplated for reservoir 12 to have approximate length and width dimensions of twelve inches and eight inches, respectively. The corresponding length dimension for the most preferred embodiment of collection pan 6 would be approximately ten inches. Therefore, in the most preferred embodiment it is contemplated for at least the length of reservoir 12 to exceed the length of collection pan 6 to provide a more stable configuration for spill-free fluid collection. In contrast, the width of collection pan 6 can vary relative to the width of reservoir 12, and even exceed the width of reservoir 12, as long as the overall stability of fluid recovery system 2 is preserved for spill-free fluid collection. Also, in FIGS. 1 and 2 collection pan 6 is shown to be substantially square in shape. However, in the most preferred embodiment of fluid recovery system 2 it is contemplated for collection pan 6 to be either rectangular or square and have a width dimension ranging between eight and ten inches. Also, although not limited thereto, it is contemplated for collection pan 6 in the most preferred embodiment to have a center depth dimension of approximately three inches. FIG. 2 shows the most preferred embodiment of collection pan 6 from a side view as being positioned slightly off-center relative to reservoir 12, with the fluid transfer pipe 10 depending centrally downward from collection pan 6 being connected to fluid chamber 40 in a position between the center of reservoir 12 and baffle 26. In addition, FIGS. 1 and 2 each show a first end support 24 attached to reservoir 12 at its narrowed discharge end, and a second end support 24' attached to the opposed end of reservoir 12 adjacent to air chamber 42. FIG. 1 further shows a fluid discharge opening 44 centered through the lower portion of end support 24, and a discharge hose 30 poised for threaded connection to fluid discharge opening 44. In the most preferred embodiment discharge hose 30 would be made from flame-resistant rubber hydraulic hose that protects recovered fluid (not shown) from accidental ignition. FIG. 1 shows discharge hose 30 having a male-threaded quick-disconnect coupler 32 on one of its ends for rapid attachment to another segment of flame-resistant hydraulic hose (not shown) if needed, and the opposing end of discharge hose 30 having male threads for connection to female threaded discharge opening 44. Although the size and positioning of discharge opening 44 are not critical, in the preferred embodiment it is contemplated that discharge opening be dimensioned to accommodate standard sizes of hydraulic hose and be centered near the bottom of end support 24. As can be seen in both FIGS. 1 and 2, end support 24' has a slightly taller height dimension than end support 24, providing a slight downward incline to the bottom surface of fluid chamber 40 between baffle 26 and discharge opening 44 so that fluid (not shown) gravity-fed into fluid chamber 40 from collection pan 6 will inherently move toward discharge opening 44. In the preferred embodiment it is contemplated for end supports 24 and 24' to be permanently attached to opposing ends of reservoir 12 and for end supports 24 and 24' to extend the full width of reservoir 12. FIGS. 1 and 2 also show handles 34 and 34' connected to end supports 24 and 24', respectively. Although FIGS. 1 and 2 show handles 34 to be angular and generally U-shaped, and placed into a substantially horizontal position, such configuration and orientation are not critical, and it is also contemplated for handles 34 to have configurations different from that shown, such as semi-circular or elliptical, and for handles 34 and 34' to be attached to end supports 24 and 24' in other orientations, including a substantially vertical position wherein handles 34 and 34' depend upwardly from the upper surfaces of end supports 24 and 24', respectively.

In FIG. 1 collection pan 6 is shown to have an inside fluid collection surface 36 that slopes downward in all directions toward a centrally positioned screen 8 that functions to block objects (not shown) from entering fluid chamber 40 which have the potential of interfering with fluid flow through discharge opening 44. It is contemplated that screen 8 could optionally be made removable from collection pan 6. As can be seen in FIG. 1, screen 8 is aligned with fluid transfer pipe 10 that downwardly and centrally depends from the bottom surface of collection pan 6, and fluid (not shown) passing through screen 8 would enter fluid transfer pipe 10. The mesh size, pattern of openings through screen 8, the material from which it is made, and the means by which screen 8 is attached to collection pan 6 are not critical. Whereas fluid transfer pipe 10 provides a part of the fluid connection means between collection pan 6 and fluid chamber 40, in both FIGS. 1 and 2 the connection of collection pan 6 to fluid chamber 40 is further shown to comprise a fluid receiving tube 14 upwardly depending from the upper surface of fluid chamber 40, near to flexible baffle 26. In the most preferred embodiment, although not limited thereto, it is contemplated for fluid receiving tube 14 to be three-fourths of an inch in diameter. FIGS. 1 and 2 each show fluid transfer pipe 10 having its distal end positioned within the upper end of fluid receiving tube 14, with a fluid intake valve 16 connected through fluid receiving tube 14 that selectively permits fluid communication between collection pan 6 and fluid chamber 40. In the preferred embodiment of the present invention the type of valve used for fluid intake valve 16 is not critical, however, it is contemplated for fluid intake valve 16 to be configured to allow complete blockage of gravity-fed fluid flow from collection pan 6 to fluid chamber 40, to allow full unobstructed fluid flow between collection pan 6 to fluid chamber 40, and to allow various fluid flow rates therebetween. For artistic purposes, fluid receiving tube 14 and fluid transfer pipe 10 in FIG. 1 are shown to have a shortened height dimension, and the preferred embodiments would be expected to have a greater spaced-apart distance between collection pan 6 and reservoir 12 than is displayed. In contrast to FIGS. 1 and 2 where fluid intake valve 16 is shown connected through fluid receiving tube 14, and although not shown, it is also considered to be within the scope of the present invention to have fluid intake valve 16 connected through fluid transfer pipe 10, with fluid transfer pipe 10 supported upon an annular ridge, or by other means, within fluid receiving tube 14. As shown in FIG. 1 and partially shown in FIG. 2, an air intake valve 18, an air relief valve 20, and an air vent 22 would be connected though the upper surface of air chamber 42. In the preferred embodiment, air intake valve 18 would be used to introduce compressed air into air chamber 42 and configured to receive air from a standard size of air hose used for such purposes. In contrast, air relief valve 20 is safety feature for fluid recovery system 2 and is configured to automatically release excess air pressure in air chamber 42 should the internal pressure within air chamber 42 for any reason exceed a predetermined level considered safe. Air vent valve 22 is configured for easy hand-operated use to exhaust all or part of the compressed air in air chamber 42. To facilitate connection of air intake valve 18, air relief valve 20, and air vent 22, as well as fluid receiving tube 14, to the upper surface of reservoir 12, FIG. 1 shows a mounting plate 28 secured to the upper surface of reservoir 12 and approximately centered over flexible baffle 26. In the most preferred embodiment mounting plate 28 is permanently fixed to the top surface of reservoir 12 and provides a level and stable mounting surface for fluid transfer pipe 10, air intake 18, air relief valve 20, and air vent valve 22. Although the placement and relative positioning of air intake valve 18, air relief valve 20, and air vent 22 upon mounting plate 28 is not critical, it is contemplated that each would be positioned in sufficient spaced-apart positions so as not to weaken the upper surface of reservoir 12, and so that each can have optimal function. Also, as air chamber 42 is generally pre-charged for quick use and it is not expected for access to air intake valve 18 to be routinely needed during operation of fluid recovery system 2, in the most preferred embodiment air intake valve 18 would be positioned more centrally on mounting plate 28 in a less conveniently accessed position, and air vent valve 22 that can be used to manually release the compressed air in air chamber 42 would be located in a position of more convenient operator access. Further, since air relief valve 20 is expected to operate automatically without operator intervention, it could be positioned anywhere on mounting plate 28, even in a position made relatively inaccessible by the installation of collection pan 6. FIGS. 1 and 2 also show one lid handle 38 centrally connected to the upper surface of cover 4, in an approximately parallel position to the perimeter edges of two of the opposing sides of cover 4, and lid handle 38 extending a substantial distance across cover 4. The orientation of lid handle 38 relative to the perimeter edge is not critical, although approximate central positioning is preferred for balanced lifting of cover 4, particularly when it becomes hot from heat transferred to it from hot gear-lube-covered gears (not shown) temporarily stored within collection pan 6 or hot gear lube (not shown) recovered by collection pan 6 and transferred to fluid chamber 40. Although lid handle 38 should be sufficiently large for easy gripping by an operator (not shown), its shape and size are not limited to that shown in FIGS. 1 and 2. Also, since collection pan 6 is used to collect hot fluid and store hot gears, although not shown in FIGS. 1 and 2, it is considered to be within the scope of the present invention for lid handle 38 to comprise insulated materials. Also, the number of lid handles 38 attached to cover 4 is not critical, and it is also contemplated for cover 4 to have two or more lid handles 38, spaced apart from one another for balanced manipulation of cover 4. Further, the shape of each such lid handle 38 is not critical and each lid handle 38 used could be U-shaped, X-shaped, C-shaped, or have any other shape that would provide a means for easily, comfortably, and securely maneuvering cover 4 to lift and transport it. In the preferred embodiment it is expected that function and not design would dictate the size, configuration, and number of lid handles 38 attached to cover 4.

It is contemplated for fluid recovery system 2 to be sufficiently small so as to be easily portable, allowing one-handed transport by most operators. It is also contemplated for fluid recovery system 2 to have a solid, heavy-duty construction and to be made from durable materials such as stainless steel, so that it will not readily degrade under repeated use and continued exposure to hot automotive fluids, such as hot gear lube. Should the present invention be employed for use with fluids other than hot gear lube, it is contemplated that collection pan 6, cover 4, fluid chamber 40, and baffle 26 would be made from materials inert to such fluids for dependable, extended use. Although FIG. 1 shows reservoir 12 as being substantially rectangular in shape, as long as the overall configuration of reservoir 12 remains low in profile, it is contemplated for reservoir 12 to comprise other configurations, such as those being substantially oval or elliptical. Although not limited thereto, for most uses and to insure easy portability, it is contemplated for fluid chamber 40 to have a maximum capacity of approximately three-and-one-half quarts, with the preferred fluid holding capacity ranging between a minimum capacity of approximately two-and-one-half quarts and a maximum capacity of approximately three-and-one-half quarts. It is also contemplated in the most preferred embodiment for air chamber 42 to be configured to withstand extended pressurization at sixty pounds per square inch. In the most preferred embodiment of the present invention, baffle 26 is made from a strong, flexible material, such as a thin straight piece of stainless steel, that has the ability to flex under the pressure differentials created within reservoir 12 to assist in the movement of hot fluids in fluid chamber 40 toward discharge opening 44 and into discharge hose 30. It is contemplated that baffle 26 would extend the full width and height dimensions of reservoir 12 and be fixed in its attachment to reservoir 12. In the most preferred embodiment it is contemplated for reservoir 12 to have a length dimension of approximately twelve inches and a width dimension of approximately eight inches, to include the combined thickness dimensions of end support 24 and end support 24'. Also, the height dimension of the most preferred embodiment of reservoir 12 would narrow from a maximum of approximately four inches near to end support 24' to a minimum height dimension of approximately three inches near to end support 24. The narrowing of reservoir 12 to approximately three inches at its discharge end provides a slight incline to the bottom surface of fluid chamber 40 for inherent movement of recovered fluid (not shown) in fluid chamber 40 toward discharge opening 44. Although not limited thereto in the most preferred embodiment it is contemplated for the height of fluid recovery system 2, between the bottom surface of end panel 24' and the upper perimeter of collection pan 6, to be approximately nine-and-one-fourth inches. This will permit fluid recovery system 2 to be easily and promptly placed beneath a motor vehicle (not shown) prior to fluid recovery with minimal adjustment and achieve spill-free gear lube recovery. FIG. 1 shows collection pan 6 having a substantially square configuration. In the most preferred embodiment collection pan 6 would either have a square configuration with the length dimension of each of its sides being approximately ten inches, or a rectangular configuration with its length dimension being approximately ten inches and its width dimension being approximately eight inches. At a minimum, the shape of collection pan 6 must remain sufficiently wide for spill-free fluid collection without being so overly large to raise the center of gravity of fluid recovery system 2 to a point where it no longer is stable when subjected to casual contact during use. Whether rectangular or square, in the most preferred embodiment it is contemplated for the center depth dimension of collection pan 6 to be approximately three inches below its upper perimeter.

To use fluid recovery system 2 fluid transfer pipe 10 is inserted into fluid receiving tube 14 to place collection pan 6 in its usable position above fluid chamber 40, and the male threaded end of fluid discharge hose 30 is connected to female threaded opening 44 on end support 24. If needed to extend the reach of discharge hose 30, male-threaded quick-disconnect coupler 32 on the opposing end of discharge hose 30 can be connected to one or more additional segments of flame-resistant hydraulic hose (not shown). Prior to use, fluid intake valve 16 is adjusted to block fluid communication between collection pan 6 and fluid chamber 40. Also, air chamber 42 is pre-charged with compressed air to a pressure of approximately sixty pounds per square inch. Using handles 34 and 34', the assembled invention is then positioned so that collection pan 6 is centered below the fluid outlet of a motor vehicle (not shown), and the motor vehicle fluid (not shown) targeted for recovery is drained onto the inside collection surface 36 of collection pan 6 without splashing or spills. For safe storage of the drained motor vehicle fluid until it is needed for reuse, fluid intake valve 16 would be opened and the motor vehicle fluid would be gravity-fed into fluid chamber 40. When substantially all of the drained motor vehicle fluid has been transferred into fluid chamber 40, fluid intake valve 16 is closed and cover 4 is placed securely over the upper open end of collection pan 6 to temporarily seal inside collection surface 36 and the recovered motor vehicle fluid (not shown) against airborne contaminants, as well as protect recovered motor vehicle fluid that is flammable from inadvertent sources of ignition. During transfer of the recovered motor vehicle fluid from collection pan 6 to fluid chamber 40, the distal end of the flame-resistant discharge hose 30 should be elevated to a height greater than that of the fluid level in reservoir 12, or otherwise positioned or secured so as to block premature flow of the recovered motor vehicle fluid from the distal end. When the recovered motor vehicle fluid is needed for reuse, fluid intake valve 16 would be opened and cover 4 on collection pan 6 would at least partially removed, whereby the pressurized air chamber 42 would then cause baffle 26 to flex and assist in the movement of the recovered motor vehicle fluid into flexible discharge hose 30 for dispensing into any selected receptacle (not shown) without a mess, including the source from which it was drained when it is still serviceable. Care should be taken in removing cover 4 when hot fluid is recovered, as heat sufficient heat can be transferred to cover 4 and other parts of the present invention to make them very hot to touch. After use of the fluid recovery system 2 is complete, collection pan 6 can be promptly removed from reservoir 12 for cleaning and/or to place fluid recovery system 2 in a more compact configuration for storage. When the present invention is used for recovery of hot gear lube from the quick-change rear end of a race vehicle (not shown), assembly and operation of fluid recovery system 2 would be substantially similar, with the hot drain lube being returned to the quick-change rear end as long as the drain lube remains serviceable. In addition, hot gear-lube-covered gears (not shown) recovered from the quick-change rear end can be temporarily stored on the inside collection surface 36 of collection pan 6 to minimize mess, allow the gears to cool, protect the gear-lube-covered gears from airborne contaminants and other debris while cooling, and protect the residual gear lube on the gears from accidental ignition.

What is claimed is:

1. A portable system for the recovery and temporary contamination-free storage of fluid drained from a motor vehicle, and the prompt, safe, and spill-free return of recovered fluid that is still serviceable back to the source from which the fluid was drained, said system comprising:

a low profile reservoir having a fluid chamber and an adjoining air chamber, said air chamber being smaller than said fluid chamber, a flexible baffle separating said fluid chamber from said air chamber, said fluid chamber having a discharge end and a baffle end each having a height, said discharge end having a discharge opening therethrough, and said height of said discharge end being lower than said height of said baffle end;

fluid collection means positioned above said fluid chamber and adapted for selective fluid communication with said fluid chamber, said fluid collection means having an upper open end and being adapted for spill-free gathering of fluid drained from a motor vehicle;

air intake valve means adapted for connection to said air chamber and pre-charging said air chamber with compressed air to a minimum pressure of 60 pounds per square inch;

removable lid means adapted for securely covering said upper open end in said fluid collection means and sealing said upper open end from airborne contamination, and inadvertent sources of ignition;

flame-resistant discharge means adapted for rapid connection to and fluid communication with said discharge opening; and handle means adapted for supporting said reservoir during transport thereof so that said handles can be used for moving said reservoir under the fluid outlet of a motor vehicle and said fluid collection means can be positioned under the fluid outlet to recover fluid drained from the fluid outlet, and allowing recovered fluid to be gravity-fed into said fluid chamber for safe storage away from sources of airborne contamination and inadvertent ignition, and thereafter assisted by said pre-charged air chamber in combination with said flexible baffle to exit said fluid chamber through said discharge opening, move through said flame resistant discharge means, and optionally return to the source from which the fluid was drained.

2. The system of claim 1 wherein said handle means further comprises a pair of opposed end supports attached to said reservoir, with one of said end supports being positioned adjacent to said air chamber and the other of said end supports being positioned adjacent to said fluid chamber, and said handle means also comprises a pair of handles wherein each said handle depends from a different one of said end supports and is configured for hand-held manipulation of said reservoir, and wherein the one of said end supports positioned adjacent to said fluid chamber has an opening therethrough configured and oriented for leak-proof fluid communication with said discharge opening in said fluid chamber.

3. The system of claim 1 further comprising a screen attached to said fluid collection means in a position to filter all recovered fluid before gravity-fed entry into said fluid chamber.

4. The system of claim 1 wherein said fluid collection means is detachably connected to said fluid chamber.

5. The system of claim 1 wherein said reservoir further comprises a top surface, said system further comprises a mounting plate permanently fixed to said top surface, an air relief valve connected through said mounting plate and communicating with said air chamber, an air vent valve connected through said mounting plate and communicating with said air chamber, and a fluid transfer tube connected through said mounting plate and placing said communicating with said air chamber, and wherein said air intake valve means is also connected through said mounting plate.

6. The system of claim 1 wherein said removable lid means further comprises at least one easily gripped lid handle.

7. The system of claim 6 wherein said lid handle comprises thermally insulated materials.

8. The system of claim 1 wherein said reservoir, said fluid collection means, and said flame-resistant discharge means are each adapted for use with hot fluids, wherein said reservoir and said fluid collection means have a combined height dimension of less than ten inches for fitting under the quick-change rear end of a race vehicle, wherein said fluid chamber has a minimum fluid capacity of approximately two-and-one-half quarts, and wherein said fluid collection means has a center and a wide fluid collection surface that downwardly slopes toward said center to a depth of approximately three inches and also has sufficient surface area to temporarily store several messy hot gear-lube-covered ratio gears removed from a quick-change rear end.

9. An portable system for the recovery and temporary contamination-free storage of fluid drained from a motor vehicle, and the prompt, safe, and spill-free return of recovered fluid that is still serviceable back to the source from which the fluid was drained, said system comprising:

a low profile reservoir having a fluid chamber and an adjoining air chamber, said air chamber being smaller than said fluid chamber, a flexible baffle separating said fluid chamber from said air chamber, said fluid chamber having a discharge end and a baffle end each having a height, said discharge end having a discharge opening therethrough, and said height of said discharge end being lower than said height of said baffle end;

fluid collection means positioned above said fluid chamber, said fluid collection means having an upper open end and also being adapted for spill-free gathering of fluid drained from a motor vehicle;

a first valve means connected between said fluid collection means and said fluid chamber, said first valve means being adapted for selectively controlling flow of fluid between said fluid collection means and said fluid chamber;

a second valve means connected to said air chamber and adapted for pre-charging said air chamber with compressed air to a minimum pressure of 60 pounds per square inch;

removable lid means adapted for securely covering said upper open end in said fluid collection means and sealing said upper open end from airborne contamination, and inadvertent sources of ignition;

a flame-resistant discharge hose with a male threaded end adapted for rapid connection to and leak-proof fluid communication with said discharge opening, and also having an opposed end with a quick-couple connection means for connection to additional segments of discharge hose; and handle means adapted for supporting said reservoir during transport thereof so that said handles can be used for moving said reservoir under the fluid outlet of a motor vehicle and said fluid collection means can be positioned under the fluid outlet to recover fluid drained from the fluid outlet, and allowing recovered fluid to be gravity-fed into said fluid chamber for safe storage away from sources of airborne contamination and inadvertent ignition, and thereafter assisted by said precharged air chamber in combination with said flexible baffle to exit said fluid chamber through said discharge opening, move through said flame resistant discharge means, and optionally return to the source from which the fluid was drained.

10. The system of claim 9 wherein said handle means further comprises a pair of opposed end supports attached to said reservoir, with one of said end supports being positioned adjacent to said air chamber and the other of said end supports being positioned adjacent to said fluid chamber, wherein each said handle depends from a different one of said end supports and is configured for hand-held manipulation of said reservoir, and wherein the one of said end supports positioned adjacent to said fluid chamber has an opening therethrough configured and oriented for leak-proof fluid communication with said discharge opening in said fluid chamber.

11. The system of claim 9 further comprising a screen attached to said fluid collection means in a position to filter all recovered fluid before gravity-fed entry into said fluid chamber.

12. The system of claim 9 wherein said fluid collection means is detachably connected to said fluid chamber.

13. The system of claim 9 wherein said reservoir further comprises a top surface, said system further comprises a mounting plate permanently fixed to said top surface, an air relief valve connected through said mounting plate and communicating with said air chamber, an air vent valve connected through said mounting plate and communicating with said air chamber, and a fluid transfer tube connected through said mounting plate and placing said communicating with said air chamber, and wherein said air intake valve means is also connected through said mounting plate.

14. The system of claim 9 wherein said removable lid means further comprises at least one lid handle.

15. The system of claim 14 wherein said lid handle comprises thermally insulated materials.

16. The system of claim 9 wherein said reservoir, said fluid collection means, and said flame-resistant discharge means are each adapted for use with hot fluids, wherein said reservoir and said fluid collection means have a combined height dimension of less than ten inches for easily fitting under the quick-change rear end of a race vehicle, wherein said fluid chamber has a minimum fluid capacity of approximately two-and-one-half quarts, and wherein said fluid collection means has a center and a wide fluid collection surface that downwardly slopes toward said center to a depth of approximately three inches and also has sufficient surface area to temporarily store several messy hot gear-lube-covered ratio gears removed from a quick-change rear end.

17. A method for recovery and temporary contamination-free storage of fluid drained from a motor vehicle and prompt, safe, and spill-free return of recovered fluid that is still serviceable hack to the source from which the fluid was drained, said method comprising the steps of:

providing a portable system having a reservoir with an air chamber, a fluid chamber, said air chamber being smaller than said fluid chamber, and a flexible baffle separating said fluid chamber from said air chamber, said air chamber having an air intake valve, and said fluid chamber having a fluid receiving tube depending upwardly therefrom, and a discharge opening;

providing a collection pan with a fluid transfer tube depending downwardly therefrom, a collection pan lid, a flame-resistant discharge hose, and a fluid intake valve connected to said fluid receiving tube;

securely positioning said fluid transfer tube within said fluid receiving tube to locate said collection pan above said fluid chamber;

manipulating said fluid intake valve to block fluid communication between said collection pan and said fluid chamber;

securely attaching said discharge hose to said discharge opening;

using said air intake valve to pressurize said air chamber with compressed air to a pressure of approximately sixty pounds per square inch;

placing said collection pan under a motor vehicle fluid outlet;

allowing to drain into said collection pan;

manipulating said fluid intake valve to open fluid communication between said collection pan and said fluid chamber to permit gravity-fed transfer of recovered fluid collected in said collection pan to said fluid chamber;

when fluid transfer is complete, again manipulating said fluid intake valve to block fluid communication between said collection pan and said fluid chamber;

using said collection pan lid to cover said collection pan for protection of said collection pan from airborne contamination and sources of ignition; and when the collected fluid is needed for reuse, manipulating said fluid intake valve to restore fluid communication between said collection pan and said fluid chamber, and removing said cover, whereafter said flexible baffle bends to assist movement of fluid recovered from said fluid chamber, where still serviceable, and into said flame-resistant discharge hose for return to the source from which the fluid was drained.

18. The method of claim 17 wherein said reservoir further comprises opposing end supports and a handle attached to each end support; wherein said collection pan being adapted for detachable connection to said reservoir and having a screen adjacent to said fluid transfer tube in a position to filter all recovered fluid before gravity-fed entry into said fluid chamber, and wherein said step of placing said collection pan under a motor vehicle fluid outlet further comprises a step of using said handles to accomplish placement of said collection pan under the motor vehicle fluid outlet.

19. The method of claim 17 wherein said reservoir further comprises a top surface; further comprising the steps of providing a mounting plate and permanently fixing said mounting plate to said top surface of said reservoir; further comprising the steps of providing an air relief valve and connecting said air relief valve through said mounting plate to place said air relief valve in fluid communication with said air chamber, and further comprising the steps of providing an air vent valve and connecting said air vent valve through said mounting plate to place said air vent valve in fluid communication with said air chamber; and further wherein said air intake valve and said fluid receiving tube are connected through said mounting plate.

20. The method of claim 17 wherein said reservoir, said collection pan, and said flame-resistant discharge hose are each adapted for use with hot fluids; wherein said reservoir and said collection pan have a maximum combined height dimension of ten inches for fitting under the quick-change rear end of a race vehicle; wherein said fluid chamber has a minimum fluid capacity of approximately two-and-one-half quarts; and wherein said collection pan has a center and a wide fluid collection surface that downwardly slopes toward said center to a depth of approximately three inches and also has sufficient surface area to temporarily store several hot gear-lube-covered ratio gears removed from a quick-change rear end.

* * * * *